(12) United States Patent
Kiuchi et al.

(10) Patent No.: US 12,314,875 B2
(45) Date of Patent: May 27, 2025

(54) VALUE CHAIN PLAN LINKING METHOD, VALUE CHAIN PLAN LINKING APPARATUS, AND VALUE CHAIN PLAN LINKING SYSTEM

(71) Applicant: HITACHI, LTD., Tokyo (JP)

(72) Inventors: Atsuki Kiuchi, Tokyo (JP); Tazu Nomoto, Tokyo (JP)

(73) Assignee: Hitachi, Ltd., Tokyo (JP)

(*) Notice: Subject to any disclaimer, the term of this patent is extended or adjusted under 35 U.S.C. 154(b) by 192 days.

(21) Appl. No.: 17/925,140

(22) PCT Filed: May 10, 2021

(86) PCT No.: PCT/JP2021/017735
§ 371 (c)(1),
(2) Date: Nov. 14, 2022

(87) PCT Pub. No.: WO2022/059252
PCT Pub. Date: Mar. 24, 2022

(65) Prior Publication Data
US 2023/0186185 A1    Jun. 15, 2023

(30) Foreign Application Priority Data
Sep. 17, 2020    (JP) .................................. 2020-156429

(51) Int. Cl.
*G06Q 10/04* (2023.01)
*G06Q 10/063* (2023.01)

(52) U.S. Cl.
CPC .......... *G06Q 10/04* (2013.01); *G06Q 10/063* (2013.01)

(58) Field of Classification Search
CPC .......... G06Q 10/087; G06Q 10/06393; G06Q 10/067; G06Q 10/063; G06Q 10/0637;
(Continued)

(56) References Cited

U.S. PATENT DOCUMENTS 6,885,902 B2 * 4/2005 Crampton .............. G06Q 10/06
700/32
7,379,882 B2 * 5/2008 Adams .............. G06Q 30/0282
705/347
(Continued)

FOREIGN PATENT DOCUMENTS

JP    2013-012185 A    1/2013

OTHER PUBLICATIONS

Oracle Retail Advanced Inventory Planning—Store and Warehouse Replenishment Planning User Guide For the RPAS Fusion Client, Release 14.1, Oracle, Dec. 2014 (Year: 2014).*
(Continued)

*Primary Examiner* — Scott L Jarrett
(74) *Attorney, Agent, or Firm* — Miles & Stockbridge, P.C.

(57) ABSTRACT

A plan parameter obtaining an optimal result between a plurality of software pieces that are linkingly operated is calculated. A value chain plan linking method that uses a value chain plan linking apparatus that combines and executes a plurality of software pieces according to a task. At least any one of the plurality of software pieces uses, as an input parameter, an output parameter obtained from any one of other software pieces included in the plurality of software pieces. The value chain plan linking apparatus executes a different solution requiring step of calculating a plurality of the output parameters in each of the plurality of software pieces, and a displaying step of displaying, as an overall plan, the output parameter obtaining a best key performance indicator value in the entire value chain according to a combination of the input and output parameters of the plurality of software pieces.

7 Claims, 9 Drawing Sheets

(58) Field of Classification Search
CPC ... G06Q 10/08; G06Q 20/203; G06Q 10/0631
See application file for complete search history.

(56) References Cited

U.S. PATENT DOCUMENTS

| | | | | |
|---|---|---|---|---|
| 7,490,051 | B1* | 2/2009 | Van Romunde | G16H 10/20 705/7.11 |
| 7,539,630 | B2* | 5/2009 | Crampton | G06Q 20/203 705/26.1 |
| 7,788,119 | B2* | 8/2010 | Najmi | G06Q 10/06315 705/7.22 |
| 7,835,933 | B2* | 11/2010 | Casati | G06Q 10/0631 705/7.12 |
| 7,941,236 | B2* | 5/2011 | Spearman | G06Q 10/06 705/28 |
| 8,069,437 | B2* | 11/2011 | Aigner | G06Q 10/10 717/121 |
| 8,359,218 | B2* | 1/2013 | Poth | G06Q 10/06 705/28 |
| 8,396,788 | B2* | 3/2013 | Anke | G06Q 10/06393 705/41 |
| 8,447,423 | B2* | 5/2013 | Budiman | G05B 19/41875 700/106 |
| 8,782,542 | B2* | 7/2014 | Erl | G06Q 10/087 715/764 |
| 8,819,026 | B2* | 8/2014 | Fischer | G06F 16/319 707/742 |
| 8,849,623 | B2* | 9/2014 | Carvallo | E21B 43/00 703/2 |
| 8,893,132 | B2* | 11/2014 | Okano | G06F 11/0766 718/102 |
| 9,285,798 | B2* | 3/2016 | Lamparter | G06Q 10/08 |
| 9,805,330 | B2* | 10/2017 | Surendra | G06Q 10/067 |
| 10,209,956 | B2* | 2/2019 | Fletcher | G06F 7/10 |
| 10,417,108 | B2* | 9/2019 | Tankersley | G06T 11/206 |
| 10,872,309 | B2* | 12/2020 | Surendra | G06Q 10/067 |
| 11,012,324 | B2* | 5/2021 | Dotchkoff | H04L 41/5045 |
| 11,200,130 | B2* | 12/2021 | Tankersley | G06Q 10/06393 |
| 11,216,761 | B2* | 1/2022 | Mantryvong | G06N 5/041 |
| 11,315,059 | B1* | 4/2022 | R | G06F 16/90344 |
| 11,704,612 | B2* | 7/2023 | Nomoto | G06Q 30/0206 705/7.25 |
| 11,755,559 | B1* | 9/2023 | Tankersley | G06F 16/2358 707/694 |
| 11,792,087 | B1* | 10/2023 | Toy | H04L 41/40 709/224 |
| 11,995,588 | B1* | 5/2024 | Nandeda | G06Q 10/04 |
| 2002/0040380 | A1* | 4/2002 | Harashima | G06F 9/4843 718/101 |
| 2002/0072956 | A1* | 6/2002 | Willems | G06Q 10/0639 705/7.29 |
| 2003/0149631 | A1* | 8/2003 | Crampton | G06Q 10/06 705/22 |
| 2005/0149475 | A1* | 7/2005 | Chkodrov | G06Q 10/08 |
| 2006/0053039 | A1* | 3/2006 | Gamarnik | G06Q 10/06393 705/7.11 |
| 2006/0241986 | A1* | 10/2006 | Harper | G06Q 10/04 705/7.11 |
| 2007/0050070 | A1* | 3/2007 | Strain | G06Q 10/06 700/99 |
| 2010/0125489 | A1* | 5/2010 | Surendra | G06Q 10/067 705/28 |
| 2013/0197675 | A1* | 8/2013 | McCarthy | G05B 13/021 700/28 |
| 2015/0120373 | A1* | 4/2015 | Bajaj | G06Q 10/0635 705/7.25 |
| 2015/0254589 | A1* | 9/2015 | Saxena | G06Q 10/06315 705/7.25 |
| 2016/0307136 | A1* | 10/2016 | Packowski | G06Q 10/06393 |
| 2018/0068259 | A1* | 3/2018 | Surendra | G06Q 10/087 |
| 2018/0107961 | A1* | 4/2018 | Kiuchi | G06Q 10/06315 |
| 2018/0348717 | A1* | 12/2018 | Zhao | G05B 13/048 |
| 2020/0097869 | A1* | 3/2020 | Bajaj | G06Q 10/06375 |

OTHER PUBLICATIONS

Stadtler, Hartmut et al., Supply Chain Management and Advanced Planning Springer, Fifth Edition, 2015 (Year: 2015).*

Stadtler, Harmut et al., Supply Chain Management and Advanced Planning, Fifth Edition Springer 2015 (Year: 2015).*

Adobe LiveCycle Workflow Version 7.2—Overview Adobe, Jul. 2006 (Year: 2006).*

Web Services Business Process Execution Language Version 2.0 Oasis, Apr. 11, 2007 (Year: 27).*

Oracle BPEL Process Manager 10.1.2.0.x Oracle, 2004 (Year: 2004).*

Search Report mailed Jul. 20, 2021 in International Application No. PCT/JP2021/017735.

Written Opinion mailed Jul. 20, 2021 in International Application No. PCT/JP2021/017735.

* cited by examiner

FIG. 2

APPLICATION MASTER INFORMATION 111

| APPLICATION ID (111a) | APPLICATION NAME (111b) | PARAMETER ID (111c) | KPI (111d) | GENERATION NUMBER OF SOLUTIONS (111e) |
|---|---|---|---|---|
| SUP001 | SCM OPTIMIZATION | PRM001 | INVENTORY COST | 10 |
| TRA001 | DELIVERY PLAN OPTIMIZATION | PRM002 | TRANSPORTATION COST | 10 |
| PRO001 | DETAILED SCHEDULE OPTIMIZATION | PRM003 | PRODUCTION COST | 20 |
| ... | ... | ... | ... | ... |
| SCH001 | PRODUCTION SCHEDULER | PRM010 | ARRANGEMENT COST | 10 |
| WHS001 | WAREHOUSE OPERATION OPTIMIZATION | PRM011 | PICKING COST | 20 |
| ... | ... | ... | ... | ... |

FIG. 3

OPERATION VARIABLE INFORMATION 112

| PARAMETER ID (112a) | INPUT FILE (112b) | COLUMN NAME (112c) | NUMBER OF ROWS (112d) | UPPER LIMIT (112e) | LOWER LIMIT (112f) |
|---|---|---|---|---|---|
| PRM001 | INVENTORY.csv | NUMBER OF DAYS OF INVENTORY AT SITE | 10 | 30 | 1 |
| PRM002 | NUMBER OF TRUCKS.csv | NUMBER OF TRUCKS | 22 | 60 | 1 |
| PRM003 | PRODUCTION UPPER LIMIT.csv | UPPER LIMIT VALUES/DAY | 18 | 45 | 1 |
| ... | ... | ... | ... | ... | ... |
| PRM010 | OVERTIME HOURS.csv | OVERTIME HOURS | 21 | 80 | 0 |
| PRM011 | NUMBER OF OPERATORS.csv | NUMBER OF OPERATORS | 34 | 100 | 1 |
| ... | ... | ... | ... | ... | ... |

FIG. 4

APPLICATION CHAIN INFORMATION 113

| PREVIOUS APPLICATION ID (113a) | APPLICATION ID (113b) |
|---|---|
| SUP001 | PRO001 |
| PRO001 | SCH001 |
| SCH001 | WHS001 |
| ... | ... |

FIG. 5

EXECUTION HISTORY INFORMATION 114

| APPLICATION ID (114a) | SOLUTION NO. (114b) | PARAMETER ID (114c) | PARAMETER VALUE (114d) | KPI (114e) | SOLUTION CANDIDATE FLAG (114f) |
|---|---|---|---|---|---|
| SUP001 | JOB1 | PARAM1 | 3 | 15.6 | YES |
| SUP001 | JOB2 | PARAM1 | 4 | 16.4 | YES |
| SUP001 | JOB3 | PARAM1 | 5 | 21.8 | YES |
| ... | ... | ... | ... | ... | ... |
| PRO001 | JOB1 | PARAM A | 20 | - | NO |
| PRO001 | JOB2 | PARAM A | 40 | 22.9 | YES |
| ... | ... | ... | ... | ... | ... |
| ... | ... | ... | ... | ... | ... |

FIG. 6

JOB CHAIN INFORMATION 115

| PREVIOUS APPLICATION ID | INPUT SOLUTION NO. | APPLICATION ID | SOLUTION NO. | SOLUTION RESULT |
|---|---|---|---|---|
| SUP001 | JOB1 | PRO001 | JOB1 | FAILURE |
| SUP001 | JOB1 | PRO001 | JOB2 | SUCCESS |
| PRO001 | JOB2 | SCH001 | JOB1 | SUCCESS |
| ... | ... | ... | ... | ... |
| SCH001 | JOB10 | WHS001 | JOB11 | SUCCESS |
| ... | ... | ... | ... | ... |

OPTIMIZATION RESULT INFORMATION 116

| SCENARIO ID | OPTIMAL KPI |
|---|---|
| S01 | 109.3 |
| S02 | 106.8 |
| ... | ... |
| S05 | 130.6 |
| ... | ... |

OPTIMIZATION RESULT DETAIL INFORMATION 117

| SCENARIO ID | APPLICATION ID | SOLUTION NO. | PARAMETER ID | PARAMETER VALUE |
|---|---|---|---|---|
| S01 | SUP001 | JOB1 | PARAM 1 | 3 |
| S01 | PRO001 | JOB2 | PARAM A | 10 |
| S01 | SCH001 | JOB1 | PARAM 10 | 5 |
| ... | ... | | ... | ... |
| S02 | SUP001 | JOB2 | PARAM 1 | 4 |
| ... | ... | | ... | ... |

SCENARIO INFORMATION 118

| SCENARIO ID | SCENARIO NAME |
|---|---|
| S01 | SCENARIO A |
| S02 | SCENARIO B |
| ... | ... |
| S05 | SCENARIO C |
| ... | ... |

VALUE CHAIN PLAN LINKING METHOD, VALUE CHAIN PLAN LINKING APPARATUS, AND VALUE CHAIN PLAN LINKING SYSTEM

TECHNICAL FIELD

The present invention relates to a value chain plan linking method, a value chain plan linking apparatus, and a value chain plan linking system. The present invention claims the priority of Japanese Patent Application No. 2020-156429 filed on Sep. 17, 2020, and for designated countries where incorporation by reference of the literature is permitted, the content described in the application is incorporated herein by reference.

BACKGROUND ART

Patent Literature 1 discloses that a robust optimizing apparatus that can efficiently calculate a design value that gives a Pareto solution with less variation is provided.

CITATION LIST

Patent Literature

Patent Literature 1: Japanese Patent Application Publication No. 2013-12185

SUMMARY OF INVENTION

Technical Problem

In Patent Literature 1 described above, in linkingly operating a plurality of application software pieces in a usage relationship in input and output such that the output of one application software piece is used as an input value by the other application software piece, the calculation itself of a plurality of solutions in the single application software is enabled, but it is difficult to perform solution calculation in consideration of the optimization of the output of the application software on the using side.

An object of the present invention is to provide a technique for calculating a plan parameter obtaining an optimal result between a plurality of software pieces that are linkingly operated.

Solution to Problem

This application includes a plurality of means for solving at least part of the above problem, and an example thereof is given as follows.

An aspect of the present invention is a value chain plan linking method that uses a value chain plan linking apparatus that combines and executes a plurality of software pieces according to a task. At least any one of the plurality of software pieces uses, as an input parameter, an output parameter obtained from any one of other software pieces included in the plurality of software pieces. The value chain plan linking apparatus executes a different solution requiring step of calculating a plurality of the output parameters in each of the plurality of software pieces, and a displaying step of displaying, as an overall plan, the output parameter obtaining a best key performance indicator value in the entire value chain according to a combination of the input and output parameters of the plurality of software pieces.

Advantageous Effects of Invention

According to the present invention, it is possible to calculate the plan parameter obtaining the optimal result between the plurality of software pieces that are linkingly operated.

Objects, configurations, and effects other than the above will be apparent from the description of the following embodiment.

DESCRIPTION OF EMBODIMENTS

In the following embodiment, the present invention will be described by being divided into a plurality of sections or embodiments when it is necessary for convenience, but except for the case of being particularly specified, these are not independent of one another, and are in a relationship in which one is the modification example, the detail, the supplementary explanation, and the like in part or in whole of the other.

Also, in the following embodiment, in referring to the number and the like (including the number of pieces, the numerical value, the quantity, the range, and the like) of elements, except for the case of being particularly specified, the case of being obviously limited to a specified number in principle, and the like, the number and the like of the elements are not each limited to the specified number, and may be more or less than the specified number.

Further, in the following embodiment, needless to say, the components thereof (also including an element step and the like) are not necessarily required, except for the case of being particularly specified, the case of being considered to be obviously required in principle, and the like.

Likewise, in the following embodiment, in referring to the shape, the position relationship, and the like of the components and the like, they include those that are substantially approximate or similar to the shape and the like, except for the case of being particularly specified, the case of being considered to be obviously otherwise in principle, and the like. This is ditto for the numerical value and the range.

Also, in all the drawings for explaining the embodiment, the same members are indicated by the same reference numerals as a rule, and the repeated description thereof is omitted. Hereinbelow, each embodiment of the present invention will be described with reference to the drawings.

A value chain is referred to as the chain of a value given at each stage in product supplying processes from raw material and component procurement to delivery through manufacture, inventory management, and sales. Although the delivery and inventory management tasks are not processes that directly give a value to an article, it is desirable to minimize those costs in order to directly reduce corporate profits. Therefore, to optimally operate the value chain, it is necessary to pursue both of maximized profits and minimized cost.

However, when the respective supplying processes configuring the value chain are individually seen, those KPIs (Key Performance Indicators) may be different from each other. By taking a manufacturing department as an example, in software that makes a detailed schedule (hereinafter, sometimes referred to as application software and an application), the KPI of the manufacturing department using the software is the minimization of the manufacture cost, so that making a plan that minimizes the change of a facility is an optimal plan. That is, manufacturing the same products together at the same time is an optimal plan.

On the other hand, in software that makes a product delivery plan, the KPI of a delivering department using the software is the minimization of the arrangement cost, so that loading a plurality of products requested by a demand place onto the same truck is an optimal plan. However, assuming the case where the plurality of products are delivered to the demand place, when the same products are completed at the same time as described above, the departure of the truck is required to be delayed and to be standby until a time at which other products are manufactured. This leads to inefficiency.

Further, since the space for loading the products onto the truck is limited in the factory, the number of trucks that can arrive and depart at the same time is limited. Consequently, when the completion date and time plan of the products outputted by the detailed schedule software is inputted to the delivery plan software, each truck is required to be standby until the completion of the products, with the result that there is even a possibility that the number of trucks that can arrive and depart is exceeded, which results in a non-executable solution in the delivery plan software.

According to a value chain plan linking method, apparatus, and system according to the present invention, in the value chain plan system that linkingly operates a plurality of application software pieces in a usage relationship in input and output such that the output of one application software piece is used as an input value by the other application software piece, an efficient plan that can be executed in the entire value chain can be made with consistency, so that reduction in inventory assets and improvement in production and sales efficiency can be expected.

Figure 1:
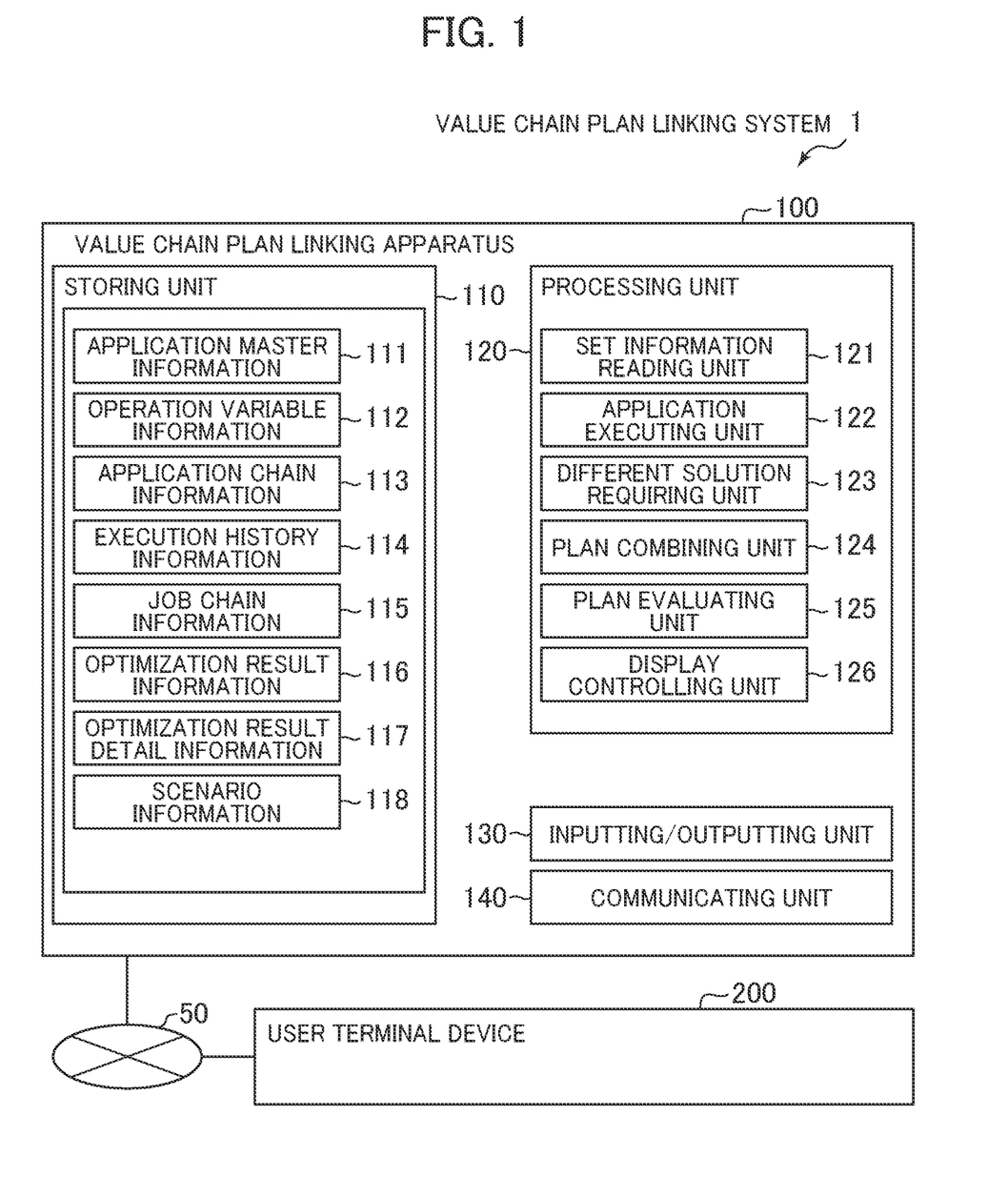
FIG. 1 is a diagram illustrating a configuration example of a value chain plan linking system according to a first embodiment.

FIG. 1 is a diagram illustrating a configuration example of the value chain plan linking system according to a first embodiment. A value chain plan linking system 1 includes a value chain plan linking apparatus 100 that combines and executes a plurality of software pieces according to a task, and a user terminal device 200 that can be communicatably connected to the value chain plan linking apparatus 100 via a network 50.

The network 50 is, for example, any one of a communication network that uses, in part or in whole, a typical public line such as a LAN (Local Area Network), a WAN (Wide Area Network), a VPN (Virtual Private Network), and the Internet, a mobile phone communication network, and the like, or a complexed network of these. Note that, the network 50 may be a radio communication network by Wi-Fi (registered trademark), 5G (Generation), and the like.

The value chain plan linking apparatus 100 includes a storing unit 110, a processing unit 120, an inputting/outputting unit 130, and a communicating unit 140. Note that of the plurality of software pieces configuring the value chain executed by the value chain plan linking apparatus 100, at least any one of the plurality of software pieces uses, as an input parameter, an output parameter obtained from anyone of other software pieces included in the plurality of software pieces.

The storing unit 110 includes application master information 111, operation variable information 112, application chain information 113, execution history information 114, job chain information 115, optimization result information 116, optimization result detail information 117, and scenario information 118.

Figure 2:
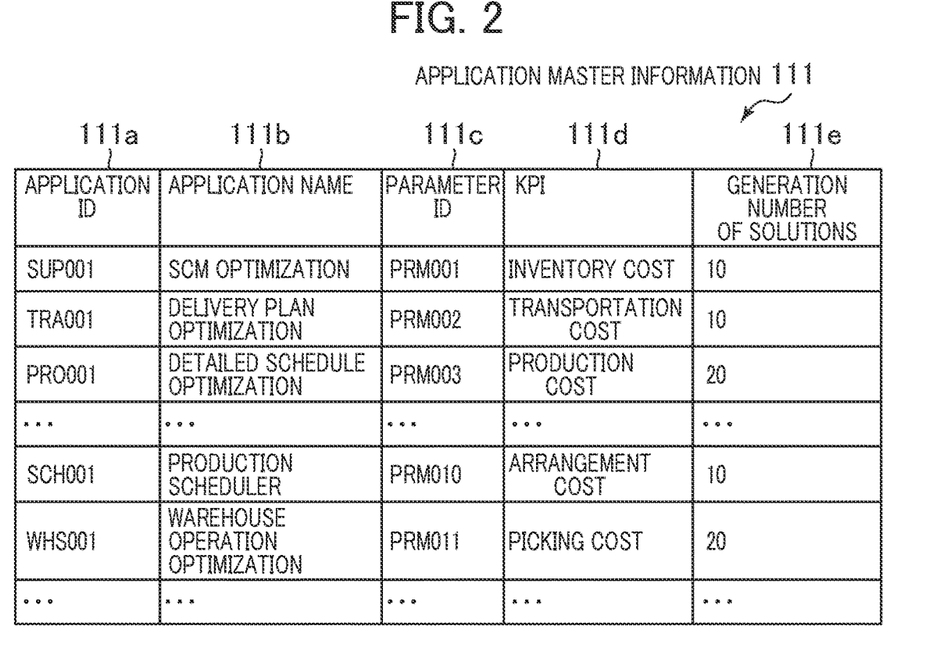
FIG. 2 is a diagram illustrating an example of the data structure of application master information.

FIG. 2 is a diagram illustrating an example of the data structure of the application master information. In the application master information 111, an application ID 111a, an application name 111b, a parameter ID 111c, a KPI 111d, and the generation number 111e of solutions are associated with each other.

The application ID 111a and the application name 111b are information identifying an entry point for exhibiting a series of functions of the software operation in the value chain plan linking system 1. For example, the application ID 111a is information identifying the processing unit of the predetermined software operation, and is an identifier assigned without being overlapped. The application name 111b is a name given to the processing unit identified by the certain application ID.

The parameter ID 111c is information identifying a variable or a variable group read in the software identified by the application ID 111a. The KPI 111d is information identifying a variable (used for the evaluation of an output) regarded as important in the software identified by the application ID 111a. The generation number 111e of solutions is information identifying the upper limit of the number obtaining robust solutions in the software identified by the application ID 111a. Note that in the embodiment according to the present invention, the robust solutions are a plurality of suboptimal solutions obtaining the KPIs of some degree by operating the parameter that the software has, with respect to one input so as not to cause deadlock and the like in the succeeding software.

Figure 3:
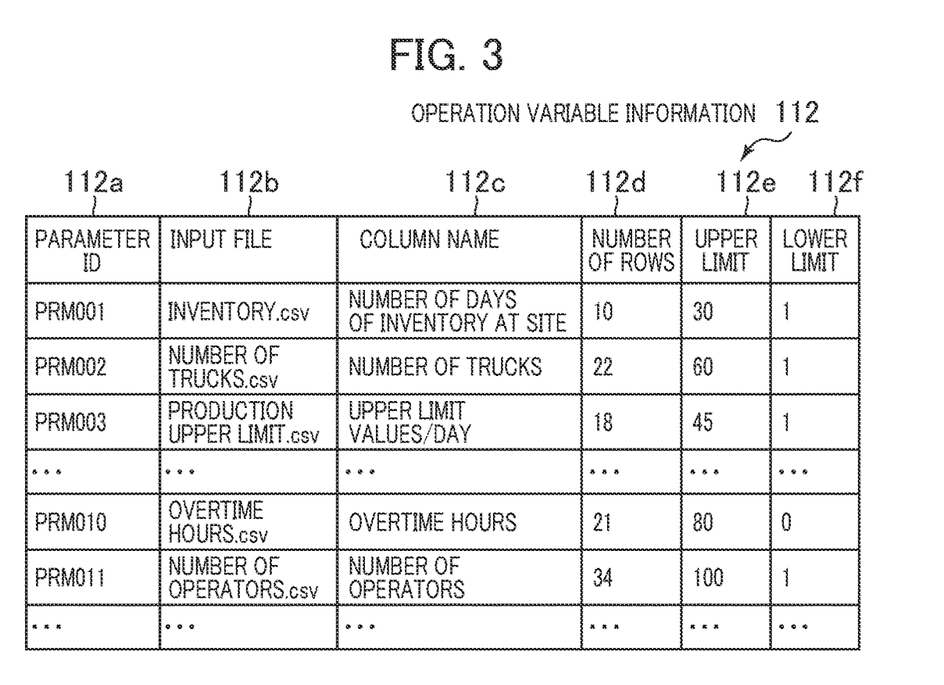
FIG. 3 is a diagram illustrating an example of the data structure of operation variable information.

FIG. 3 is a diagram illustrating an example of the data structure of the operation variable information. The operation variable is, of input information used by the software, a variable operable from the outside of the software, that is, an independent variable defined by a set value and the like, and is a variable that can change the output information of the software. In the operation variable information 112, a parameter ID 112a, an input file 112b, a column name 112c, the number 112d of rows, an upper limit 112e, and a lower limit 112f are associated with each other.

The parameter ID 112a is information identifying the variable or the variable group read in the software. The input file 112*b* is information identifying a file in which the variable group identified by the parameter ID 112*a* is stored. The column name 112*c* is information identifying the name of the variable identified by the parameter ID 112*a*, in the file identified by the input file 112*b*.

The number 112*d* of rows is information identifying the position (the number of rows) in the file in which the variable identified by the column name 112*c* is stored. The upper limit 112*e* and the lower limit 112*f* are information respectively deciding the upper limit and the lower limit of the value that can be taken by the variable identified by the parameter ID 112*a*.

Figure 4:
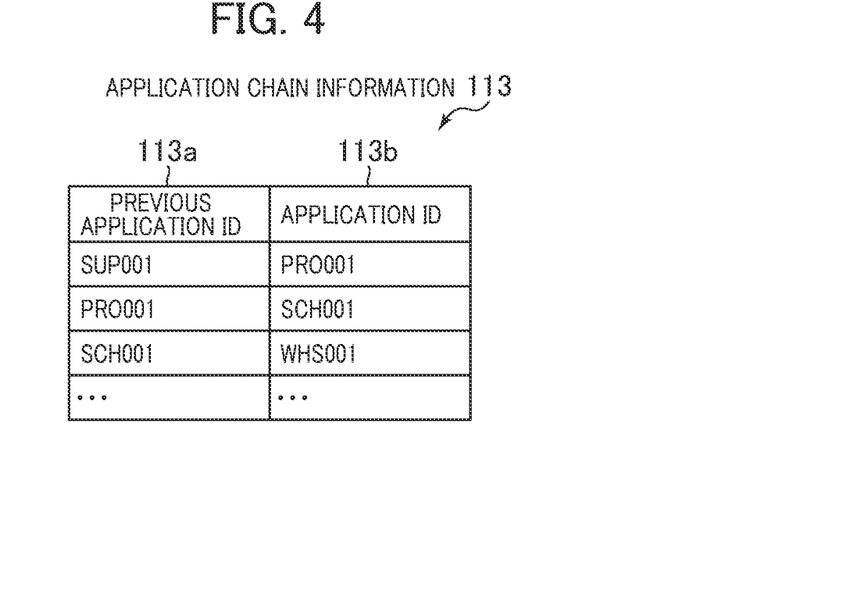
FIG. 4 is a diagram illustrating an example of the data structure of application chain information.

FIG. 4 is a diagram illustrating an example of the data structure of the application chain information. In the application chain information 113, a previous application ID 113*a* and an application ID 113*b* are associated with each other.

The previous application ID 113*a* is information identifying, of two software pieces in a relationship in which they are operated continuously, the software that is operated precedingly. And, the application ID 113*b* is information identifying, of two software pieces in a relationship in which they are operated continuously, the software operated following the software that is operated precedingly. That is, in the application chain information 113, the preceding software identified by the previous application ID 113*a* and the succeeding software identified by the application ID 113*b* are associated with each other according to the execution order thereof.

Figure 5:
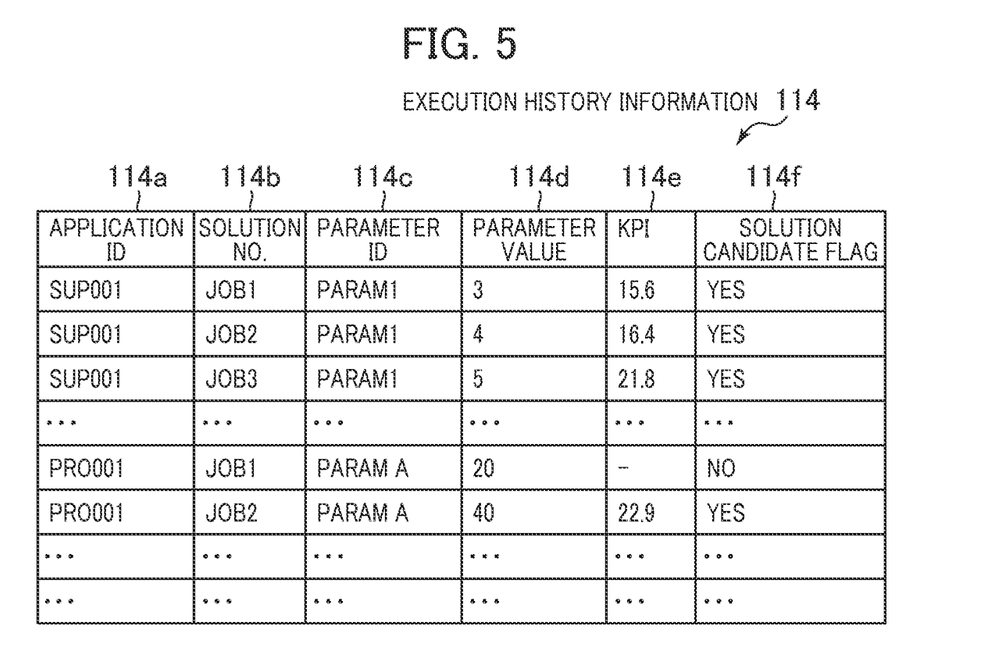
FIG. 5 is a diagram illustrating an example of the data structure of execution history information.

FIG. 5 is a diagram illustrating an example of the data structure of the execution history information. In the execution history information 114, an application ID 114*a*, a solution No. 114*b*, a parameter ID 114*c*, a parameter value 114*d*, a KPI 114*e*, and a solution candidate flag 114*f* are associated with each other.

The application ID 114*a* is information identifying the executed software. The solution No. 114*b* is information identifying a solution that is a result outputted by the software identified by the application ID 114*a*. The parameter ID 114*c* is information identifying a variable used for input by the software identified by the application ID 114*a*. The parameter value 114*d* is information identifying the value of the variable identified by the parameter ID 114*c*.

The KPI 114*e* is information identifying the value of the KPI of the result outputted by the software identified by the application ID 114*a*. The solution candidate flag 114*f* is information indicating, according to whether or not the software identified by the application ID 114*a* is non-executable, "No" when it is non-executable and "Yes" when it is executable.

Figure 6:
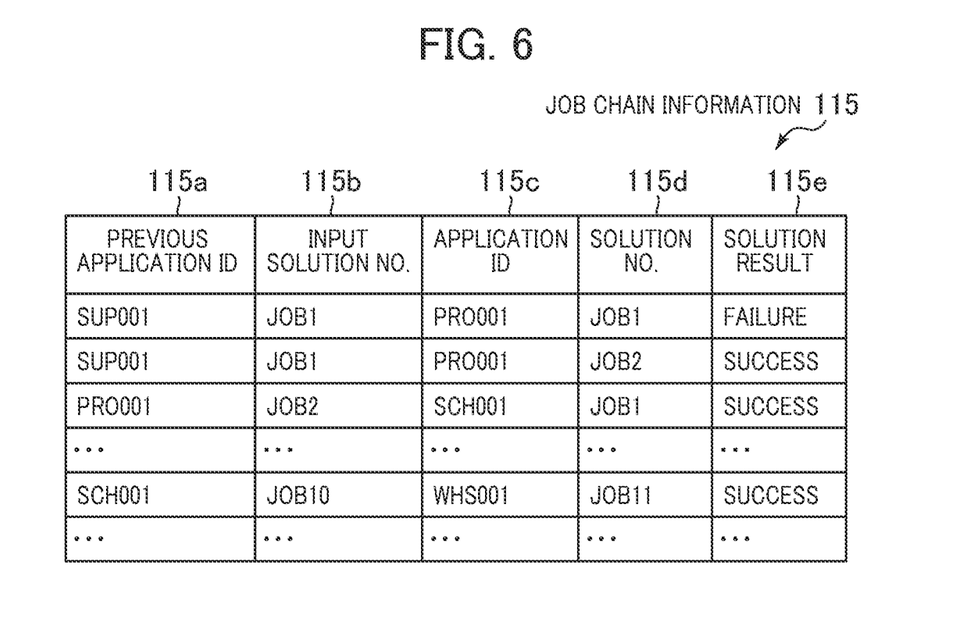
FIG. 6 is a diagram illustrating an example of the data structure of job chain information.

FIG. 6 is a diagram illustrating an example of the data structure of the job chain information. In the job chain information 115, a previous application ID 115*a*, an input solution No. 115*b*, an application ID 115*c*, a solution No. 115*d*, and a solution result 115*e* are associated with each other.

The previous application ID 115*a* is information identifying, of two software pieces that are executed continuously, the software that is executed precedingly. The input solution No. 115*b* is information identifying a solution that is a result outputted by the software identified by the previous application ID 115*a*. This solution is also said to be an input solution since it is used as an input by, of the two software pieces that are executed continuously, the software that is executed succeedingly.

The application ID 115*c* is information identifying the software that is executed continuously following the software identified by the previous application ID 115*a*. The solution No. 115*d* is information identifying a solution that is a result outputted by the software identified by the application ID 115*c*.

The solution result 115*e* is information indicating, according to whether or not the software identified by the application ID 115*c* is non-executable, "Failure" when it is non-executable and "Success" when it is executable.

Figure 7:
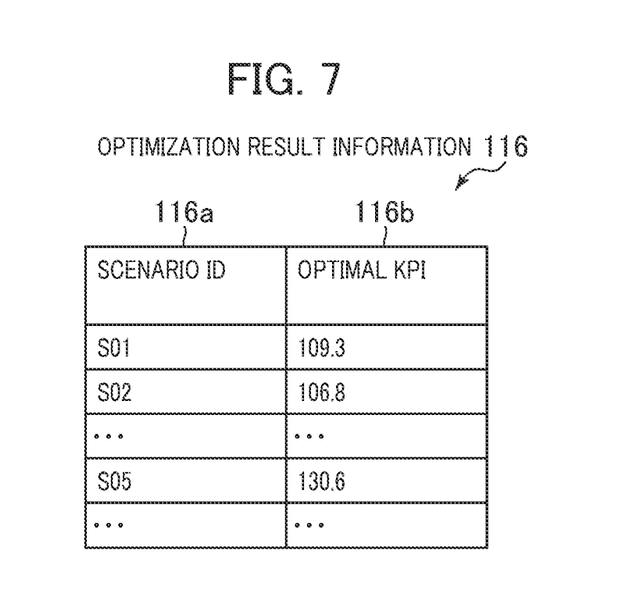
FIG. 7 is a diagram illustrating an example of the data structure of optimization result information.

FIG. 7 is a diagram illustrating an example of the data structure of the optimization result information. In the optimization result information 116, a scenario ID 116*a* and an optimal KPI 116*b* are associated with each other.

The scenario ID 116*a* is information given to each plan making of the value chain and discriminating a certain plan from other plans. The optimal KPI 116*b* is the value of the KPI that becomes optimal for the plan identified by the scenario ID 116*a*.

Figure 8:
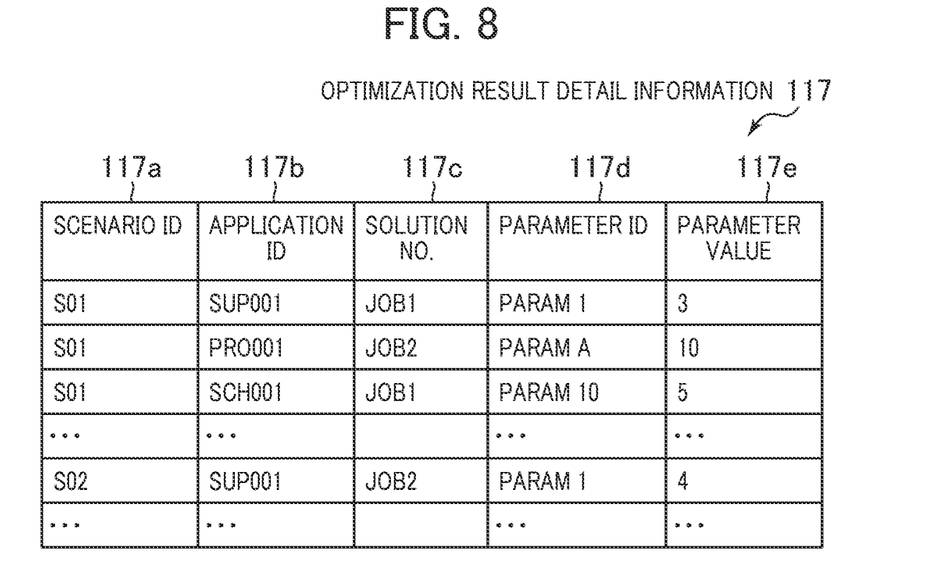
FIG. 8 is a diagram illustrating an example of the data structure of optimization result detail information.

FIG. 8 is a diagram illustrating an example of the data structure of the optimization result detail information. In the optimization result detail information 117, a scenario ID 117*a*, an application ID 117*b*, a solution No. 117*c*, a parameter ID 117*d*, and a parameter value 117*e* are associated with each other.

The scenario ID 117*a* is information given to each plan making of the value chain and discriminating a certain plan from other plans. The application ID 117*b* is information identifying the software executed for the plan identified by the scenario ID 117*a*. The solution No. 117*c* is information identifying a solution that is a result outputted by the application ID 117*b*. The parameter ID 117*d* is information identifying the parameter included in the solution identified by the solution No. 117*c*. The parameter value 117*e* is information identifying the value of the parameter identified by the parameter ID 117*d*.

Figure 9:
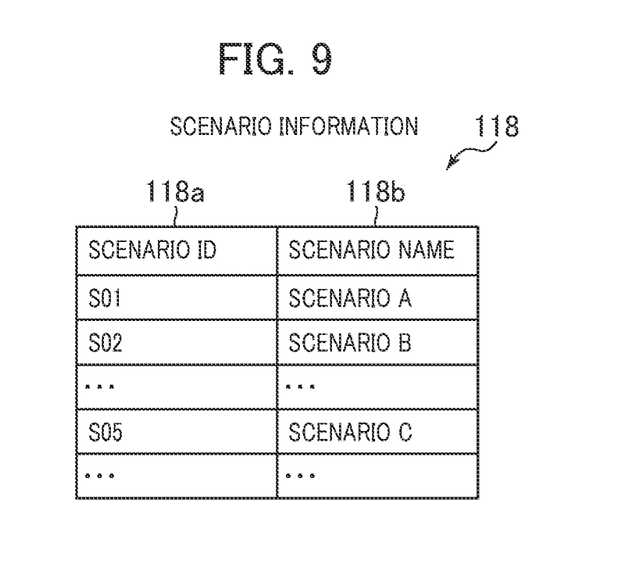
FIG. 9 is a diagram illustrating an example of the data structure of scenario information.

FIG. 9 is a diagram illustrating an example of the data structure of the scenario information. In the scenario information 118, a scenario ID 118*a* and a scenario name 118*b* are associated with each other.

The scenario ID 118*a* is information given to each plan making of the value chain and discriminating a certain plan from other plans. The scenario name 118*b* is information identifying the name of the plan identified by the scenario ID 118*a*.

Each information piece of the storing unit 110 may be obtained, as needed, from, for example, a system such as ERP (Enterprise Resource Planning), or a database accumulating data equivalent thereto via the network 50, or from an NAS (Network Attached Storage) device, and the like via the communicating unit 140. Also, each information piece of the storing unit 110 includes an output parameter, and the output parameter can be utilized as information used in another resource plan system different from the value chain plan linking apparatus 100 by being overwrite-saved. Further, when the storing unit 110 is stored in the NAS device and the like, the input and output parameters when a best KPI value is obtained are selected, and are overwrite-saved, so that they can be transmitted to other resource plan system different from the value chain plan linking apparatus.

The description of FIG. 1 is returned. The processing unit 120 includes a set information reading unit 121, an application executing unit 122, a different solution requiring unit 123, a plan combining unit 124, a plan evaluating unit 125, and a display controlling unit 126.

The set information reading unit 121 loads data necessary for the process from the storing unit 110.

The application executing unit 122 executes the plurality of software pieces in a predetermined order, and stores key performance indicator values together with output parameters into the storing unit 110. The plurality of software pieces executed by the application executing unit 122 include various types of software, and includes, for example, at least software outputting an inventory plan configuring the value chain, software outputting a production plan, and the like. In addition, various software pieces, such as software outputting a transportation plan, are included.

When the software executed by the application executing unit 122 calculates a non-executable solution, the different solution requiring unit 123 calculates an output parameter that becomes a robust optimal solution in the previous software that outputs information used as the input parameter of the software.

The plan combining unit 124 extracts, of the processing results of the software executed by the application executing unit 122, the processing result that obtains an executable solution.

The plan evaluating unit 125 sums the key performance indicator values according to the combinations of the input and output parameters of the plurality of software pieces.

The display controlling unit 126 generates screen information displayed including the success or failure of the summed result, and displays it on a displaying unit such as a display device. Alternatively, the screen information is transmitted to the user terminal device 200, and is displayed on the display device of the user terminal device 200.

For example, the inputting/outputting unit 130 displays the screen information including the information outputted as a consequence of performing the predetermined process, and receives input information inputted by a keyboard, a mouse, a touch panel, and the like.

The communicating unit 140 performs the transmission and reception of information between it and other devices including the user terminal device 200 via the network 50.

The user terminal device 200 is an information processing device that can be operated by a value chain plan maker. The user terminal device 200 is an information processing device such as a typical personal computer, including a storing unit holding data, an inputting/outputting unit controlling input and output, and a processing unit performing various processes.

Figure 10:
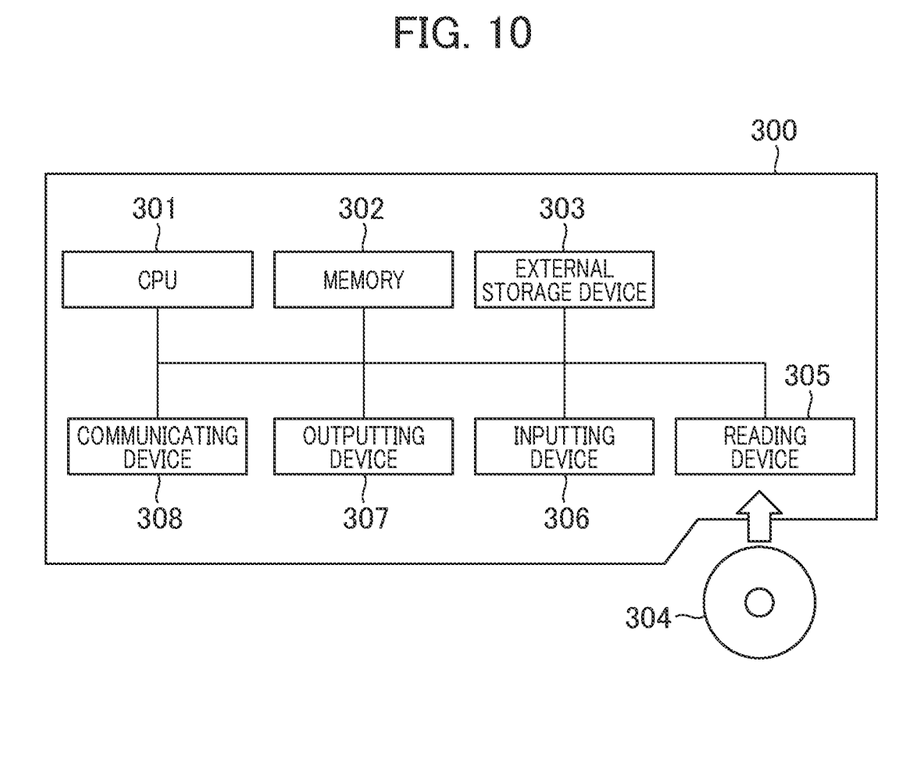
FIG. 10 is a diagram illustrating an example of the hardware configuration of a value chain plan linking apparatus.

FIG. 10 is a diagram illustrating an example of the hardware configuration of the value chain plan linking apparatus. The value chain plan linking apparatus 100 can be achieved by a typical computer 300 including a central processing unit (CPU) 301, a memory 302, an external storage device 303 such as a hard disk drive (HDD), a reading device 305 reading information with respect to a storage medium 304 having portability such as a CD (Compact Disk) and a DVD (Digital Versatile Disk), an inputting device 306 such as a keyboard, a mouse, and a barcode reader, an outputting device 307 such as a display, and a communicating device 308 communicating with other computers via the network 50 such as the Internet, or by a network system including a plurality of the computers 300. Note that needless to say, the reading device 305 may enable not only reading but also writing with respect to the storage medium 304 having portability.

For example, the set information reading unit 121, the application executing unit 122, the different solution requiring unit 123, the plan combining unit 124, the plan evaluating unit 125, and the display controlling unit 126 included in the processing unit 120 can be achieved by loading the predetermined program stored in the external storage device 303 onto the memory 302 and executing it by the CPU 301, the inputting/outputting unit 130 can be achieved such that the CPU 301 uses the inputting device 306 and the outputting device 307, the communicating unit 140 can be achieved such that the CPU 301 uses the communicating device 308, and the storing unit 110 can be achieved such that the CPU 301 uses the memory 302 or the external storage device 303.

The predetermined program achieving the processing unit 120 may be downloaded to the external storage device 303 from the storage medium 304 having portability via the reading device 305 or from the network 50 via the communicating device 308, and then, be loaded onto the memory 302 to be executed by the CPU 301. Also, the predetermined program achieving the processing unit 120 may be directly loaded onto the memory 302 from the storage medium 304 having portability via the reading device 305 or from the network via the communicating device 308, and be executed by the CPU 301.

Note that the user terminal device 200 can also be achieved by the typical computer 300 as illustrated in FIG. 10.

Figure 11:
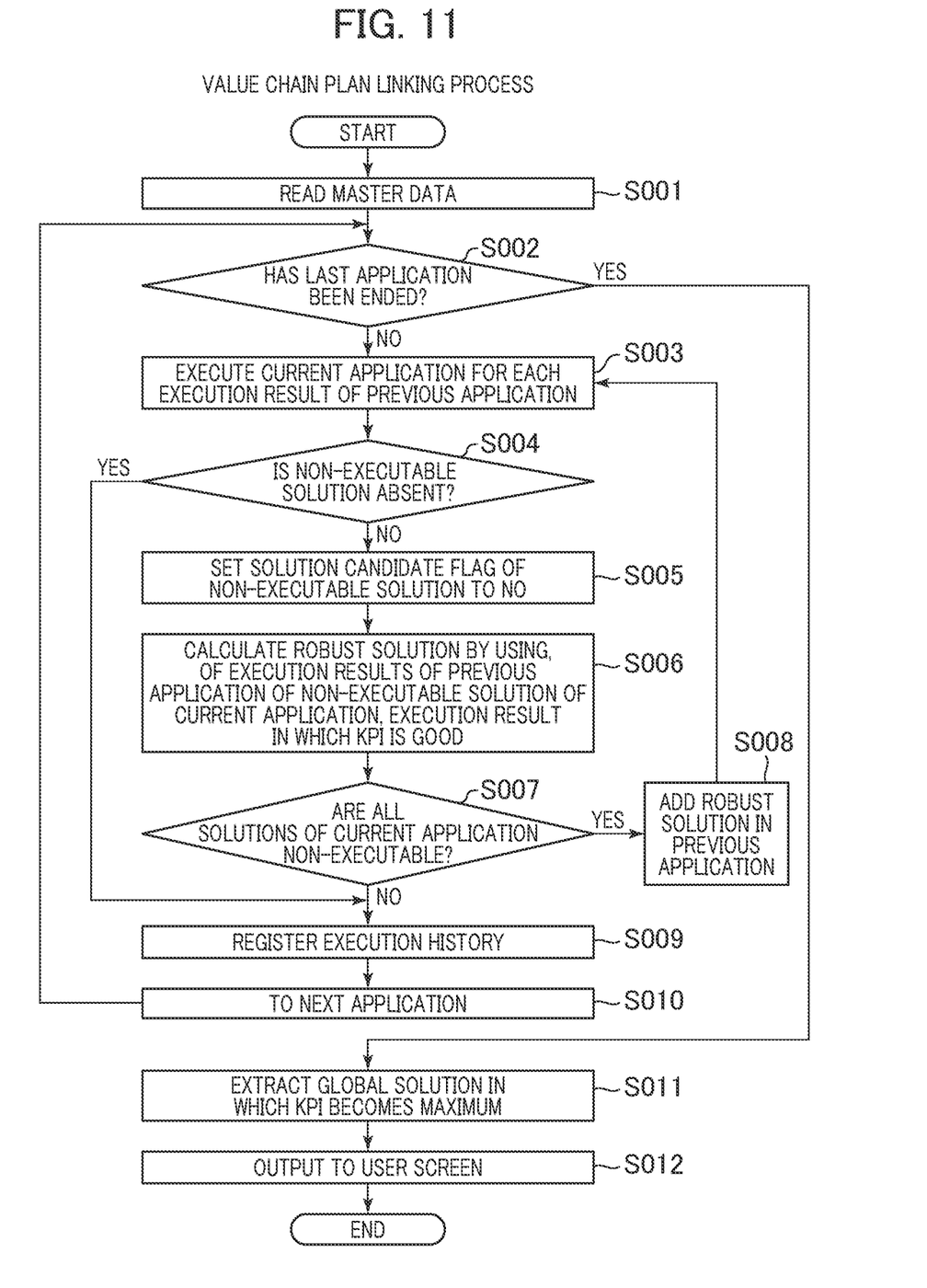
FIG. 11 is a diagram illustrating an example of the flow of a value chain plan linking process.

FIG. 11 is a diagram illustrating an example of the flow of a value chain plan linking process. The value chain plan linking process is started when the value chain plan linking apparatus 100 receives a request after start-up or according to a predetermined period (for example, daily).

First, the set information reading unit 121 reads the master data (step S001). Specifically, the set information reading unit 121 reads the application master information 111, the operation variable information 112, the application chain information 113, and the scenario information 118. In each of the following processes, the execution is controlled for each scenario ID in the scenario information 118.

The application executing unit 122 determines whether or not the last application has been ended in the application chain on the scenario (step S002). Specifically, the application executing unit 122 refers to the application chain information 113, and determines whether or not the application ID of the software in which the process has been completed is included in the previous application ID 113a. When it is not included, the application executing unit 122 determines that the last application has been ended (in step S002, "Yes"), and advances the control to step S011. When it is included, the application executing unit 122 determines that the last application has not been ended (in step S002, "No") since the succeeding software is still present, and the application executing unit 122 advances the control to step S003.

The application executing unit 122 executes the current application for each execution result of the previous application (step S003). Specifically, the application executing unit 122 refers to the application chain information 113, searches for the last-executed software from the previous application ID 113a, and refers to the associated application ID 113b to execute the corresponding software (The software executed is the current application.). For the execution, when there are a plurality of sets of the results outputted from the previous application, the application executing unit 122 executes the software for each result. Note that at the time of the first-time execution, the application executing unit 122 executes the only software that has an entry in the previous application ID 113a, the software being the application not present in the application ID 113b. In this manner, the application executing unit 122 executes the software from the head of the application chain.

The application executing unit 122 stores, in the execution history information 114, the execution results of the software corresponding to the application ID 113b, as the solution No. used as the input value, the ID and the value of the parameter, and the KPI obtained as a consequence of the execution. Also, the application executing unit 122 creates and stores the execution results of the software corresponding to the application ID 113b also for the job chain information 115.

Then, the application executing unit 122 determines whether or not there is no non-executable solution (step S004). Specifically, the application executing unit 122 identifies the result determined to be non-executable in the processing result of the executed current application. When there is no non-executable solution and all solutions are executable (in step S004, "Yes"), the application executing unit 122 advances the control to step S009.

When there is a non-executable solution (in step S004, "No"), the application executing unit 122 stores "No" when the solution is non-executable for the solution candidate flag 114f of the software (step S005). Further, when the solution is non-executable, the application executing unit 122 changes the solution result 115e of the job chain information 115 to "Failure".

Then, the different solution requiring unit 123 refers to the previous application ID 115a of the record in which the solution result 115e of the job chain information 115 is "Failure", and searches for the record corresponding to the application ID 114a of the execution history information 114. Then, the different solution requiring unit 123 refers to the KPI 114e for the searched result, and selects the solution No. 114b that obtains the best KPI. That is, the different solution requiring unit 123 identifies the parameter that obtains the best KPI in the previous application of the software that leads to the deriving of the non-executable solution.

Then, the different solution requiring unit 123 uses, as the initial operation variable values, the parameter ID 114c and the parameter value 114d of the execution history information 114, to calculate one or a plurality of robust optimal solutions within the range of the upper limit 112e and the lower limit 112f indicated in the operation variable information 112 (step S006). That is, the different solution requiring unit 123 calculates one or a plurality of output parameters each becoming a robust optimal solution on the basis of the output parameter when the KPI of the previous software becomes best within the range of the parameters used for processing the previous software previously stored in the operation variable information 112 of the storing unit 110. Note that the robust optimal solution calculation method may use, for example, Bayesian optimization, machine learning, and the like, or may use sensitivity analysis and the like in a mathematical programming method.

In the robust optimal solution calculating process, the different solution requiring unit 123 calculates a plurality of operation variable values that can calculate the best KPI. The number of solutions calculated is identified by each software piece in the generation number 111e of solutions of the application master information 111. The execution of the software is required in the robust optimal solution calculation, and the application executing unit 122 is used for the execution.

Then, the application executing unit 122 determines whether or not all solutions of the current application are non-executable (step S007). Specifically, the application executing unit 122 determines, from the execution history information 114, whether or not each robust optimal solution calculated in step S006 and other all solutions of the current application are non-executable.

When all solutions are non-executable (in step S007, "Yes"), the application executing unit 122 adds the robust optimal solution in the previous application (step S008). Specifically, the application executing unit 122 refers to the application chain information 113, and identifies the previous application ID 113a of the current application. Then, the robust optimal solution is calculated in the identified previous application, and the control is returned to step S003.

When any one of the solutions is obtained (in step S007, "No"), the application executing unit 122 registers the execution history (step S009). Specifically, the application executing unit 122 stores "Yes" when the solution is executable for the solution candidate flag 114f of the software, and stores, as the plan linking information, the execution history information 114 and the job chain information 115.

Then, the application executing unit 122 advances the process to the next application (step S010). Specifically, the application executing unit 122 refers to the application chain information 113, identifies the record in which the current application has the previous application ID 113a, and identifies, as the current application, the application that is executed succeedingly. Then, the application executing unit 122 returns the control to step S002.

When the last application has been ended (in step S002, "Yes"), the plan combining unit 124 and the plan evaluating unit 125 extract the global solution in which the KPI becomes maximum (step S011). Specifically, the plan combining unit 124 refers to the execution history information 114 and the job chain information 115 included in the plan linking information, and extracts the record in which the solution candidate flag 114f is "Yes" and the record in which the solution result 115e is "Success".

Then, the plan evaluating unit 125 creates the optimization result information 116 by targeting the records extracted by the plan combining unit 124. The plan evaluating unit 125 sums, for each scenario, the KPIs 1114f of the execution history information 114 associated with the job chain information 115 configuring the scenario, and selects the best KPI to store it in the optimal KPI 116b for each scenario ID 116a.

Note that in this KPI summation, the plan evaluating unit 125 may perform the summation by performing weighing to each KPI according to the character of the value of the KPI, the indicator value regarded as important, a combination of the input and output parameters of the plurality of software pieces, and the like. For example, when the value of the KPI that should be a small value and the value of the KPI that should be a large value are simply summed, the possibility that the evaluation of the global KPI cannot be appropriate is great, so that the processing of some value may be performed to calculate the global KPI.

Also, the plan evaluating unit 125 creates the optimization result detail information 117 by targeting the records extracted by the plan combining unit 124. The data indicating the operation variable of each application obtaining the value chain plan that can be consistently executed is stored in the optimization result detail information 117.

Then, the display controlling unit 126 outputs the optimal solution on the user screen (step S012). Specifically, the display controlling unit 126 refers to the optimization result detail information 117, generates the display screen including the KPI breakdown of each application when the global KPI is optimal, and outputs it to the display device or the user terminal device 200.

The above is an example of the flow of the value chain plan linking process. According to the value chain plan linking process, it is possible to calculate the plan parameter obtaining the optimal result between the plurality of software pieces that are linkingly operated.

Figure 12:
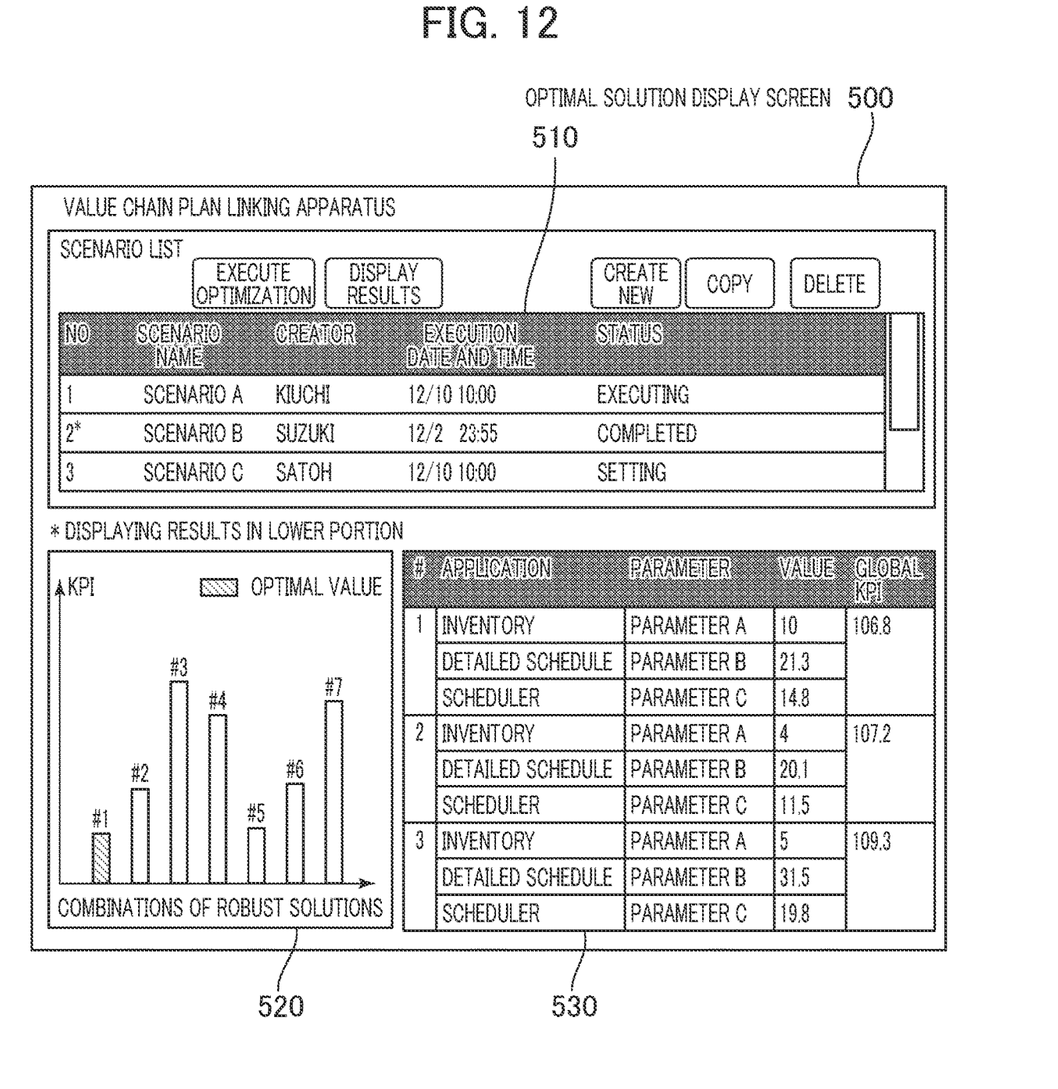
FIG. 12 is a diagram illustrating an example of an optimal solution display screen.

FIG. 12 is a diagram illustrating an example of the optimal solution display screen. The display controlling unit 126 creates an optimal solution display screen 500 by using the optimization result information 116 and the optimization result detail information 117. An example is illustrated in which the optimal solution display screen 500 displays a scenario list region 510 receiving the selection of the scenario created by each user, a KPI graph display region 520 graphing the global KPI for each scenario, and a breakdown display region 530 displaying, for each application, a breakdown obtaining the optimal KPI of each scenario. When the user selects the scenario, of the combinations of the plans executable in the entire value chain, the optimal KPI in shading display and the KPIs of other executable plans can be displayed in the lower portion, and the parameter values of the respective applications and the KPIs at that time can be individually displayed.

Figure 13:
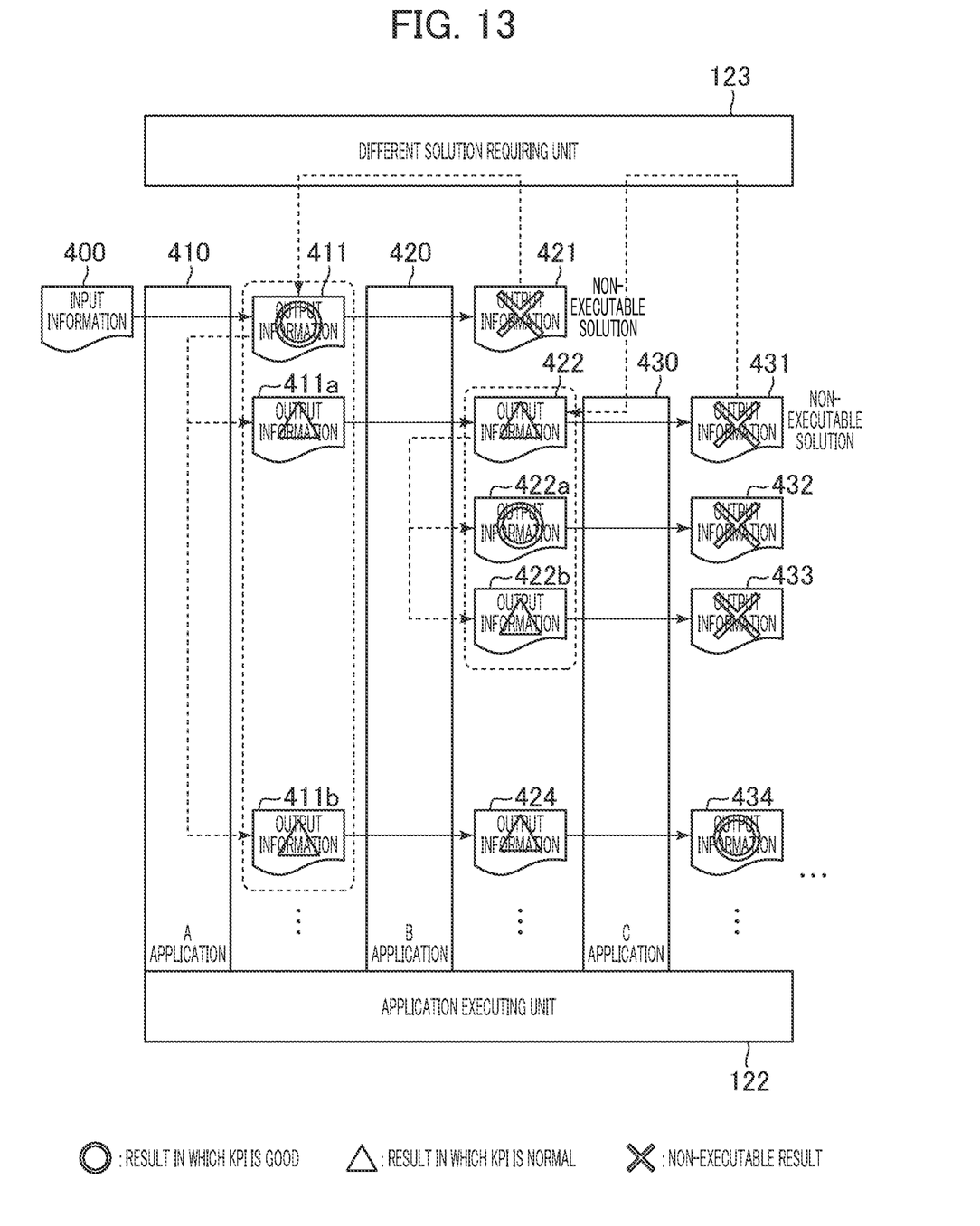
FIG. 13 is a diagram illustrating an execution example of the value chain plan linking process.

FIG. 13 is a diagram illustrating an execution example of the value chain plan linking process. The application executing unit 122 executes an A application 410, a B application 420, and a C application 430 in that order. This can be said to be an example when as a combination of "the previous application ID, the application ID", the information of "the A application, the B application" and the information of "the B application, the C application" is included in the application chain information 113.

When the A application 410 outputs output information 411 by using input information 400, the succeeding B application 420 outputs output information 421 by using the output information 411. If the output information 421 is non-executable, the different solution requiring unit 123 generates the robust optimal solution (for example, output information 411a and output information 411b) obtaining the similar KPI by identifying the output information 411 that becomes the best KPI in the A application 410 that is the previous application. Then, the application executing unit 122 executes the B application 420 by using the output information 411a to obtain output information 422.

The C application 430 following the B application 420 outputs output information 431 by using the output information 422. If the output information 431 is non-executable, the different solution requiring unit 123 generates the robust optimal solution (for example, output information 422a and output information 422b) obtaining the similar KPI by identifying the output information 422 that becomes the best KPI in the B application 420 that is the previous application.

When the C application 430 performs the process by using the output information 422a and the output information 422b, output information 432 and output information 433 are respectively obtained. Even when the output information 432 and output information 433 are non-executable, the C application 430 can be executed by using, as input information, output information 424 by the B application 420 using the output information 411b that is the robust optimal solution of the output information 411 by the A application 410, and output information 434 can be obtained.

Then, in this example, the output of the A application 410 is identified and displayed by using, as the optimal solution, the solution obtaining the best global KPI in the executed scenario. Note that in FIG. 13, of the output information, a "cross" is indicated in the case of a non-executable result, a "triangle" is indicated in the case of a result that is executable but is normal, and a "circle" is indicated in the case of a result in which the KPI is good, but another display may be performed on the output screen.

The above is the plan linking system according to the first embodiment. According to the value chain plan linking system 1, it is possible to calculate the plan parameter obtaining the optimal result between the plurality of software pieces that are linkingly operated, in particular, in the entire value chain.

Note that the present invention is not limited to the above embodiment, and includes various modification examples. For example, the plan evaluating unit 125 performs the weighing calculation when the KPIs obtained in each application are summed for each scenario, but the present invention is not limited to this, and for example, may perform the calculation by using a predetermined algorithm. Alternatively, when there is a variation range in the KPIs obtained in each application, the global KPI may be calculated according to a KPI probability distribution.

Also, the plan evaluating unit 125, which sums the KPIs, may also select the input and output parameters of the plan obtaining the best KPI to transmit them to other ERP system. By doing this, the plan evaluating unit 125 can be automatically cooperated with various systems.

Also, part of the configuration of one embodiment can be replaced with the configurations of other embodiments, and the configuration of the one embodiment can be added with the configurations of other embodiments. Also, part of the configuration of each embodiment can be subjected to addition, deletion, and replacement with respect to other configurations.

Also, in each configuration, function, processing unit, processing means, and the like of the above, some or all of these may be achieved by hardware, for example, by designing by an integrated circuit and the like. Also, each configuration, function, and the like of the above may be achieved by software piece such that a processor construes and executes a program achieving each function. The information of the program, table, file, and the like achieving each function can be placed onto a recording device such as a memory, a hard disk, and an SSD, or a recording medium such as an IC card, an SD card, and a DVD.

Also, the control lines and the information lines that are considered to be necessary for the description are represented, and all the control lines and information lines are not necessarily represented for the product. Actually, almost all the configurations may be considered to be connected to each other by a communication network, a bus, and the like.

The technique according to the present invention is not limited to the plan linking system, but can be provided in various forms, such as a server device, a computer readable program, and a value chain planning method.

LIST OF REFERENCE SIGNS

1 . . . plan linking system, 50 . . . network, 100 . . . value chain plan linking apparatus, 110 . . . storing unit, 111 . . . application master information, 112 . . . operation variable information, 113 . . . application chain information, 114 . . . execution history information, 115 . . . job chain information, 116 . . . optimization result information, 117 . . . optimization result detail information, 118 . . . scenario information, 120 . . . processing unit, 121 . . . set information reading unit, 122 . . . application executing unit, 123 . . . different solution requiring unit, 124 . . . plan combining unit, 125 . . . plan evaluating unit, 126 . . . display controlling unit, 130 . . . inputting/outputting unit, 140 . . . communicating unit, 200 . . . user terminal device

The invention claimed is:

1. A value chain plan linking method that combines and executes a plurality of software applications according to a task, the method comprising:
storing the plurality of software applications using a memory, wherein each said software application is associated with a value chain task and a key performance indicator;
storing, using the memory, a plurality of application identifiers each associated with one of said plurality of software applications;
linking, using a processor, two or more of said plurality of software applications to form a linked value chain application comprising said linked two or more software applications to be executed sequentially using the processor;
storing, using the memory, application chain information associated with each of said linked two or more software applications for each of a plurality of said linked value chains, wherein the application chain information indicates a sequential execution relationship between a first software application of the plurality of software applications and a second software application of the plurality of software applications using the application identifiers of the first and second software applications; and
executing, using the processor, a plurality of said linked two or more software applications each associated with one of said plurality of value chains, wherein at least any one of the plurality of software applications of each said linked value chain uses, as an input parameter, an output parameter obtained from any other software application of the plurality of software applications;
calculating, using the processor, an overall performance parameter value for each of said linked two or more software applications each associated with one of said plurality of linked value chains; and
outputting to a display, by the processor, an overall plan including the output parameter associated with a highest performance parameter value in an entire value chain, wherein the entire value chain comprises the plurality of linked value chains, according to a combination of the input and output parameters of the plurality of said linked two or more software applications each associated with one said linked value chain,
wherein the linking step further comprises
executing, using the processor, a different solution requiring step comprising calculating a plurality of the output parameters in each of the plurality of software applications;
determining, using the processor, whether any software application comprises a non-executable solution causing a deadlock processing failure to occur in at least one subsequently-executed software application of said linked two or more software applications due to an input parameter required by the at least one subsequently-executed software application not being available as a processing result of one of said two or more software applications; and
automatically replacing, using the processor, each said non-executable software application with a corresponding different software application comprising an one executable solution of a plurality of sub-optimal software applications each and having a key performance indicator lower than a key performance indicator associated with the replaced non-executable software application, said different software application being selected to prevent the deadlock processing failure from occurring in the at least one subsequently-executed software application of said linked two or more software applications,
wherein the processor is further configured to execute each of the plurality of sub-optimal software applications separately using each output parameter of an earlier-executed software application, to calculate the processing result for each of the plurality of sub-optimal software applications.

2. The value chain plan linking method according to claim 1,
wherein the different solution requiring step further comprises calculating one or more of the output parameters when the key performance indicator value calculated by the processor is a highest value.

3. The value chain plan linking method according to claim 1,
wherein the output parameter is information used in an external resource plan system which is different from a value chain plan linking apparatus associated with the value chain plan linking method.

4. The value chain plan linking method according to claim 1, further comprising:
performing a plan evaluating step of selecting the input and output parameters when a key performance indicator value calculated by the processor is a highest value; and
transmitting the input and output parameters to an external resource plan system which is different from a value chain plan linking apparatus associated with the value chain plan linking method.

5. The value chain plan linking method according to claim 1,
further comprising performing a plan evaluating step comprising a summation using a predetermined weighting of a key performance indicator value calculated by the processor according to a combination of the input and output parameters of the plurality of software applications.

6. The value chain plan linking method according to claim 1,
wherein the plurality of software applications includes at least an application which causes the processor to output an inventory plan and an application which causes the processor to output a production plan.

7. A value chain plan linking system comprising:
a processor configured to combine and execute a plurality of software applications according to a task; and
a memory coupled to the processor and configured to
store the plurality of software applications, wherein each said software application is associated with a value chain task and a key performance indicator; and
store a plurality of application identifiers each associated with one of said plurality of software applications;
wherein the processor is further configured to link two or more of said plurality of software applications to form a linked value chain application comprising said linked two or more software applications to be executed sequentially using the processor;
wherein the memory is further configured to store application chain information associated with each of said linked two or more software applications for each of a plurality of said linked value chains, wherein the application chain information indicates a sequential execution relationship between a first software application of the plurality of software applications and a second software application of the plurality of software applications using the application identifiers of the first and second software applications, wherein the processor is further configured to execute a plurality of said linked two or more software applications each associated with one of said plurality of value chains, wherein at least any one of the plurality of software applications of each said linked value chain uses, as an input parameter, an output parameter obtained from any other software application of the plurality of software applications;

calculate an overall performance parameter value for each of said linked two or more software applications each associated with one of said plurality of linked value chains; and output to a display an overall plan including the output parameter associated with a highest performance parameter value in an entire value chain, wherein the entire value chain comprises the plurality of linked value chains, according to a combination of the input and output parameters of the plurality of said linked two or more software applications each associated with one said linked value chain, wherein during the executing a plurality of said linked value chains, the processor is further configured to
execute a different solution requiring step comprising calculating a plurality of the output parameters in each of the plurality of software applications;

determine whether any software application comprises a non-executable solution causing a deadlock processing failure to occur in at least one subsequently-executed software application of said linked two or more software applications due to an input parameter required by the at least one subsequently-executed software application not being available as a processing result of one of said two or more software applications; and automatically replace each said non-executable software application with a corresponding different software application comprising one executable solution of a plurality of sub-optimal software applications each having a key performance indicator lower than a key performance indicator associated with the replaced non-executable software application, said different software application being selected to prevent the deadlock processing failure from occurring in the at least one subsequently-executed software application of said linked two or more software applications, wherein the processor is further configured to execute each of the plurality of sub-optimal software applications separately using each output parameter of an earlier-executed software application, to calculate the processing result for each of the plurality of sub-optimal software applications.

* * * * *